United States Patent
Anliker et al.

(10) Patent No.: US 12,442,673 B2
(45) Date of Patent: Oct. 14, 2025

(54) SENSOR ASSEMBLY (71) Applicant: HUBA CONTROL AG, Würenlos (CH)

(72) Inventors: Peter Anliker, Küttigen (CH); Stefan Menzi, Zürich (CH); Mathias Stammeier, Zürich (CH); Timo Sarrach, Baden (CH)

(73) Assignee: Huba Control AG, Würenlos (CH)

( * ) Notice: Subject to any disclaimer, the term of this patent is extended or adjusted under 35 U.S.C. 154(b) by 373 days.

(21) Appl. No.: 18/013,974

(22) PCT Filed: Jun. 30, 2021

(86) PCT No.: PCT/EP2021/068050
§ 371 (c)(1),
(2) Date: Dec. 30, 2022

(87) PCT Pub. No.: WO2022/003050
PCT Pub. Date: Jan. 6, 2022

(65) Prior Publication Data
US 2023/0288237 A1     Sep. 14, 2023

(30) Foreign Application Priority Data
Jul. 3, 2020  (EP) .................................... 20183867

(51) Int. Cl.
*G01F 1/66*       (2022.01)
*G01F 1/667*      (2022.01)
*G01F 15/02*      (2006.01)
*H10N 30/30*      (2023.01)
*H10N 30/87*      (2023.01)

(52) U.S. Cl.
CPC .............. *G01F 1/662* (2013.01); *G01F 1/667* (2013.01); *G01F 15/022* (2013.01); *H10N 30/302* (2023.02); *H10N 30/871* (2023.02)

(58) Field of Classification Search
CPC ........ G01F 1/667; G01F 1/662; G01F 15/022; G01N 29/02; G01N 29/222; H10N 30/871
See application file for complete search history.

(56) References Cited

FOREIGN PATENT DOCUMENTS

| DE | 10158015 A1 | 6/2003 | |
|---|---|---|---|
| EP | 0790490 A1 * | 8/1997 | ............. G01F 1/662 |
| EP | 0708313 B1 | 6/1998 | |
| EP | 1315144 A2 * | 5/2003 | ............. G01F 1/662 |
| EP | 0890826 B1 | 11/2009 | |

(Continued)

*Primary Examiner* — Benjamin R Schmitt
(74) *Attorney, Agent, or Firm* — The Webb Law Firm (57) ABSTRACT

A sensor assembly is provided including a housing including a tubular portion, a membrane, a cable, an ultrasonic sensor, and a further sensor. The tubular portion includes a first end. The tubular portion connects to the membrane at the first end of the tubular portion. The ultrasonic sensor includes a piezoelectric transducer and a wrap-around electrode. The piezoelectric transducer includes a first side and a second side, the second side of the piezoelectric transducer being disposed opposite the first side of the piezoelectric transducer. The first side of the piezoelectric transducer is mounted to the membrane. The wrap-around electrode includes a first side and a second side, the second portion of the wrap-around electrode being disposed opposite the first portion of the wrap-around electrode.

15 Claims, 2 Drawing Sheets

(56) References Cited

FOREIGN PATENT DOCUMENTS

| | | | |
|---|---|---|---|
| EP | 2270439 B1 | 1/2011 | |
| EP | 3199923 A1 | 8/2017 | |
| EP | 3617665 A1 | 3/2020 | |
| JP | S4986778 A | 8/1974 | |
| JP | 3036368 B * | 3/1996 | ............. G01S 7/521 |
| JP | 3036368 B2 | 4/2000 | |
| JP | 2002204498 A | 7/2002 | |
| JP | 2004125805 A | 4/2004 | |
| JP | 2009152786 A | 7/2009 | |
| JP | 2018157347 A | 10/2018 | |
| WO | 2014029405 A1 | 2/2014 | |
| WO | 2016012024 A1 | 1/2016 | |

* cited by examiner

SENSOR ASSEMBLY

CROSS-REFERENCE TO RELATED APPLICATIONS

This application is the United States national phase of International Application No. PCT/EP2021/068050 filed Jun. 30, 2021, and claims priority to European Patent Application No. 20183867.9 filed Jul. 3, 2020, the disclosures of each of which are hereby incorporated by reference in their entireties.

BACKGROUND OF THE INVENTION

Field of the Invention

The present disclosure teaches a sensor assembly having a piezoelectric transducer.

Description of Related Art

Flow meters such as ultrasonic flow meters are commonly employed to record flow signals in appliances for heating, ventilation, and/or air conditioning. A flow meter may, for instance, record flow of a fluid such as water or glycol through a heat meter. A quantity indicative of heat transfer can then be derived from the recorded flow and from additional measurements of temperature. Ultrasonic flow meters are also employed to record flow of transformer oil circulating through the ducts of power transformers. A recorded flow value can then be used to adjust speeds of oil pumps while the power transformer is in oil directed and in air forced cooling mode.

A European patent application EP0890826A1 was filed on 8 Jul. 1998 and was published on 13 Jan. 1999. EP0890826A1 teaches an ultrasonic flow meter. The flow meter of EP0890826A1 comprises a first 11 and a second ultrasonic transducer 12. The transducers 11, 12 are mounted at different positions along the flow path through an enclosure 1. The first transducer 11 is mounted downstream 15 of the second transducer 12. A plurality of reflectors 13, 14 defines a path for propagation of ultrasonic signals from the first transducer 11 to the second transducer 12.

An application EP2270439A1 for a European patent was filed on 3 Jul. 2009 and was published on 5 Jan. 2011. The patent application EP2270439A1 discloses a flow meter comprising a moulded reflector unit and a method for making the flow meter. The flow meter of EP2270439A1 comprises a pair of reflectors 612, 614.

An international application WO2014/029405A1 was filed on 22 Aug. 2013 and was published on 27 Feb. 2014. WO2014/029405A1 teaches an ultrasonic flow meter comprising a connection arrangement. The flow meter according to WO2014/029405A1 comprises a pair of ultrasonic transducers 6, 7. Three ultrasonic reflectors 8, 9, 10 are fitted into depressions in a guide element 52 inside a meter housing 2. The ultrasonic reflectors 8, 9, 10 provide a path for propagation of ultrasonic signals between the ultrasonic transducers 6, 7.

On 21 Jul. 2014, another international application WO2016/012024A1 was filed. The same application was published on 28 Jan. 2016. WO2016/012024A1 deals with a flow conduit insert for an ultrasonic flow meter. A plurality of fixation elements (FE) is provided inside a flow conduit (FC).

A European patent application EP0708313A2 was filed on 20 Oct. 1995. The application was published on 24 Apr. 1996. EP0708313A2 teaches an ultrasonic flow meter. The flow meter of EP3199923A1 comprises three reflectors 9, 10, 11 as well as a pair of ultrasonic transducers 5, 6. The flow meter can additionally comprise a temperature probe 4. The temperature probe 4 is optional and projects into the fluid path of the flow meter. The temperature probe 4 is separate from the ultrasonic transducers 5, 6. The additional temperature probe 4 affords measurements of amounts of heat in the fluid path.

On 26 Jan. 2016, a European patent application EP3199923A1 was filed. The application was published on 2 Aug. 2017. EP3199923A1 teaches an ultrasonic flow meter. The flow meter of EP3199923A1 also comprises a three reflectors 12a, 12b, 12c. The reflectors 12a, 12b, 12c are mounted to an inner wall 11 of the meter. EP3199923A1 teaches that heat meters can employ ultrasonic flow meters. According to EP3199923A1, heat meters additionally comprise temperature transducers to measure supply and return temperatures. These measurements afford quantitative determinations of heat exchange.

A patent application EP3617665A1 was filed by HUBA CONTROL AG, CH on 11 Mar. 2019. The application was published on 4 Mar. 2020. EP3617665A1 deals with an ultrasonic flow meter. EP3617665A1 discloses a flow meter 1 having a flow channel 2 arranged inside a housing 3. The flow channel 2 enables flow of a fluid such as water, glycol, mixtures of water and of glycol, oil, especially transformer oil, etc. The application teaches that the walls of the flow channel 2 are suitable for such fluids. The application also teaches that the walls of the flow channel are made of a material that withstands typical temperatures inside the flow channel 2.

SUMMARY OF THE INVENTION

The instant disclosure deals with transducers for flow meters. The present disclosure merges a first piezoelectric transducer and a second transducer into a single assembly. The instant disclosure improves on the coupling between the two transducers and any fluid flowing through the fluid path of a flow meter.

The present disclosure teaches a sensor assembly comprising a first piezoelectric transducer and a second transducer. The second transducer preferably comprises a temperature sensor such as a Pt100 and/or Pt1000 and/or Ni1000 temperature sensor. The first and the second transducers are arranged inside the same housing. A membrane at one end of the housing couples the piezoelectric transducer to any fluid in the fluid path. The housing and the membrane separate a fluid in a fluid path of a flow meter from an electric assembly including the two transducers.

Solutions known from the prior art require flow meters to provide separate ports for temperature measurements and for flow measurements. Every such port involves a risk of leakage. By accommodating a temperature transducer and a piezoelectric transducer in a single housing, a single port suffices to measure both temperature and flow velocity. The flow meter becomes less prone to leakages.

The membrane and/or the housing are made of materials with sufficient heat conductivity. The housing is preferably made of a ceramics material. The housing can also be made of a metallic material. The membrane shall also be made of a material that affords propagation of ultrasonic signals from the transducer to the fluid in the fluid path and vice versa.

The temperature transducer must thermally couple to the piezoelectric transducer. The coupling between the temperature transducer and the piezoelectric transducer allows the temperature transducer to thermally couple to the fluid in the fluid path via the piezoelectric transducer. That said, the coupling between the temperature transducer and the piezoelectric transducer shall be as little as possible impair the ultrasonic transmission characteristic of the piezoelectric transducer. To that end, a piezoelectric transducer comprises a piezoelectric member and a wrap-around electrode. The wrap-around electrode enables connecting positive and negative electrodes of the piezoelectric member from the same side of the piezoelectric member.

A piezoelectric member in operation may exhibit minimum vibrations at the location of the wrap-around electrode. The temperature transducer advantageously connects to the piezoelectric member at or near the location of the wrap-around electrode. The connection at or near the wrap-around electrode minimizes any adverse impacts of the temperature transducer on the transmission characteristics of the piezoelectric transducer. The connection at or near the wrap-around electrode also yields a robust arrangement since it minimizes any adverse impacts of vibrations on the mechanical connection.

The ultrasonic sensor typically comprises a membrane such as a thin membrane. The membrane transfers variations in pressure from a fluid in the fluid path of a flow meter to the piezoelectric member. The fluid in the fluid path often is a liquid. Temperatures of the fluid in the fluid path reach 353 Kelvins and/or 373 Kelvins and/or even 393 Kelvins depending on the fluid in the fluid path and/or depending on pressure. The mechanical connection between the membrane and the piezoelectric member shall withstand such temperatures of the fluid in the fluid path. The connection shall also withstand high mechanical shear forces at frequencies of at least 100 Kilohertz, preferably at least 500 Kilohertz or even at least 1 Megahertz. In addition, the connection must not be electrically conductive. In an embodiment, an epoxy resin connects the membrane to the piezoelectric member. The epoxy resin in its cured state ideally has a glass transition temperature above 373 Kelvins or even above 393 Kelvins. The epoxy resin in its cured state ideally has a Shore D hardness of at least 60, preferably of at least 70.

Any impact of disturbances such as oscillations and/or vibrations of the housing of the flow meter on the sensor assembly shall be mitigated. To that end, a seal member such as a gasket and/or an O-ring is interposed between the housing of the sensor assembly and the housing of the flow meter. The seal member preferably forms the only mechanical connection between the sensor assembly and the flow meter. To that end, the housing of the sensor assembly comprises a tubular portion and a brim portion connected to the tubular portion. The brim portion advantageously comprises an annular brim portion and/or an annular brim and projects radially from the tubular portion. It is envisaged that the brim portion and the tubular portion form a single piece. The seal member such as a gasket and/or an O-ring is arranged in between the brim portion and the housing of the flow meter.

The piezoelectric member is isolated from the housing of the sensor assembly to further mitigate adverse influences of vibrations of the housings on the piezoelectric member. The piezoelectric member is arranged on the membrane such that a lateral gap forms between the housing of the sensor assembly and the piezoelectric member. The lateral gap is advantageously filled with air and separates the tubular portion of the housing from the piezoelectric member.

The piezoelectric member comprises a first side and a second side. The first side of the piezoelectric member connects to the membrane, preferably via a layer of epoxy resin. The second side is opposite the first side and faces away from the membrane. A longitudinal gap is arranged adjacent the second side of the piezoelectric member. The longitudinal gap is preferably filled with air. The longitudinal gap further isolates the piezoelectric member from the housing of the sensor assembly.

A flexible cable connects to the piezoelectric member and also to the temperature transducer. The cable affords electric and mechanic connections to the piezoelectric member and to the temperature transducer. Due to its flexibility, the cable absorbs high-frequency mechanical vibrations and decouples the piezoelectric member from other members of the assembly.

The flexible cable can be flat and can comprise three or more conductors. Advantageously, a first conductor of the cable electrically connects to the piezoelectric member, but not to the temperature transducer. A second conductor electrically connects to the piezoelectric member and to the temperature transducer. The second conductor advantageously provides a common connection to ground. The third conductor electrically ideally connects to the temperature transducer, but not to the piezoelectric member.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
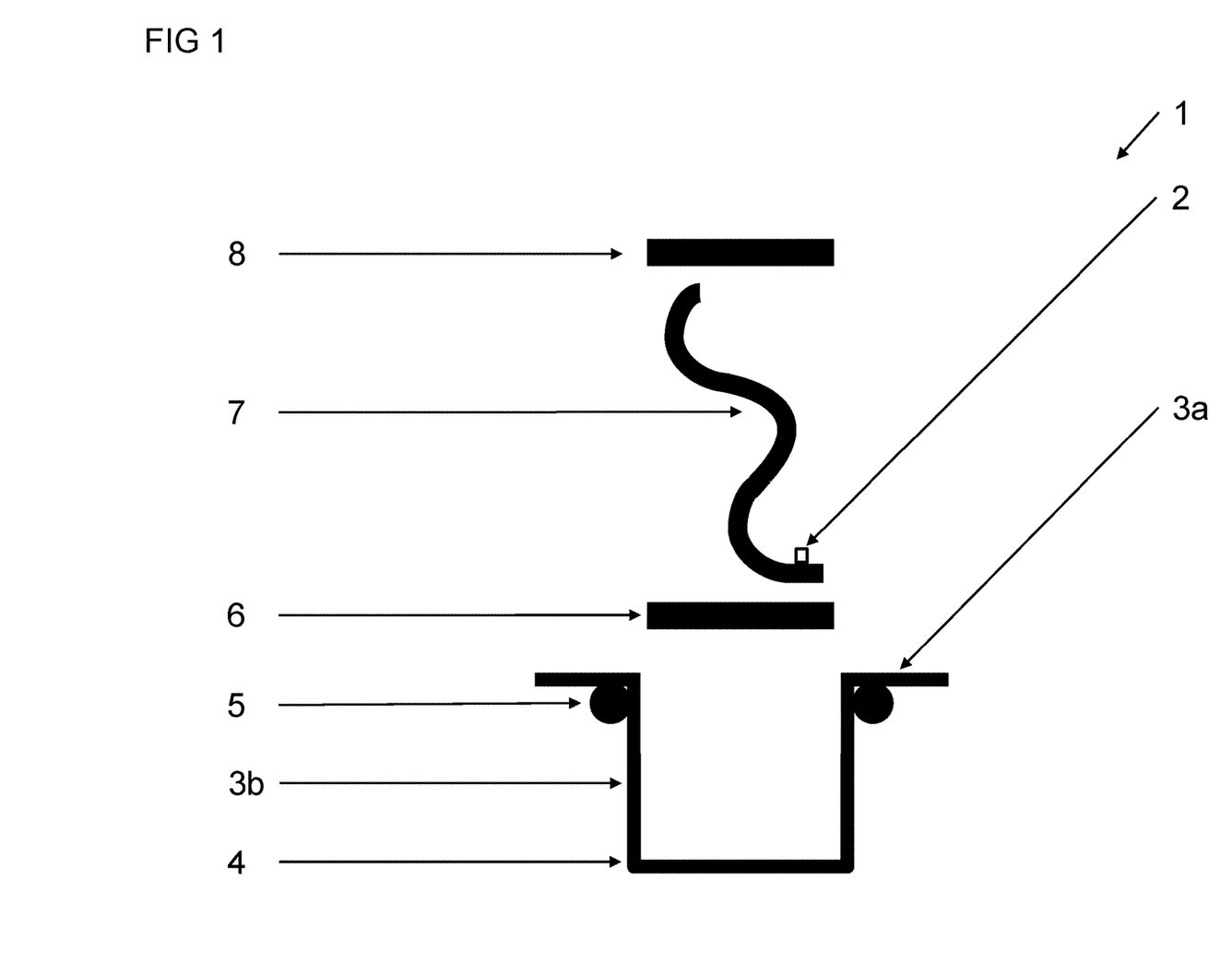
FIG. 1 is a schematic view of the various components of a sensor assembly of the instant disclosure.

FIG. 1 shows the various components of the sensor assembly 1 described herein. The sensor assembly 1 comprises a housing 3a, 3b. In an embodiment, the housing 3a, 3b is made of a ceramics material. The housing is preferably made of engineering ceramics, yet more preferably of aluminum oxide ($Al_2O_3$) and/or of silicon carbide (SiC) and/or of zirconium dioxide ($ZrO_2$) and/or of magnesium oxide (MgO). More specifically, the housing 3a, 3b can be made of aluminum oxide ceramics ($Al_2O_3$). In some embodiments, the housing 3a, 3b is made of aluminum oxide ceramics with more than 92 percent purity. It is also envisaged that the housing 3a, 3b is made of aluminum oxide with 96 percent purity. It is still envisaged that the housing 3a, 3b is made of aluminum oxide having a purity above 99 percent. Higher levels of purity may offer benefits in terms of mechanical tightness, mechanical brittleness, and dielectric strength.

In an alternate embodiment, the housing 3a, 3b is made of a metallic material such as steel, e.g., austenitic (stainless) steel or ferrite steel. The housing 3a, 3b can also be made of aluminum (alloy) and/or brass and/or gunmetal. According to an aspect, the housing 3 is manufactured using an additive manufacturing technique such as three-dimensional printing. Manufacture of the housing 3a, 3b can, in a special embodiment, involve selective laser sintering.

The housing 3a, 3b comprises a tubular portion 3b. The tubular portion 3b advantageously is or comprises a cylindrical portion and has a first end and a second end. The second end of the tubular portion 3b is disposed opposite the first end of the tubular portion 3b. The tubular portion 3b has a length dimension between its first end and its second end. The length dimension of the tubular portion 3*b* advantageously is at least 7 millimetres, more advantageously at least 10 millimetres or even at least 15 millimetres. A long tubular portion 3*b* affords sufficient space to accommodate transducers and/or circuits.

The first end of the tubular portion 3*b* connects to a membrane 4. The membrane 4 comprises a first side and a second side, the second side being opposite the first side. When the sensor assembly 1 is mounted to a flow meter, the first side of the membrane 4 is in contact with a fluid such as a liquid flowing through the flow meter. The second side of the membrane 4 faces away from the fluid flowing through the flow meter and points toward the second end of the tubular portion 3*b*.

A brim portion 3*a* connects to the second end of the tubular portion 3*b*. The brim portion 3*a* projects radially from the tubular portion 3*b*. More specifically, the brim portion 3*a* projects radially from the second end of the tubular portion 3*b*. The brim portion 3*a* preferably is annular. It is envisaged that the brim portion 3*a* is at least 1 millimetre wide, preferably at least 2 millimetres wide or even 5 millimetres wide. A wide brim portion 3*a* affords enough overlap between the housing 3*a*, 3*b* of the sensor assembly and any housing of a flow meter. The arrangement thus becomes mechanically robust.

It is envisaged that the tubular portion 3*b* and the brim portion 3*a* form a single piece.

The brim portion 3*a* of the housing 3*a*, 3*b* can provide a groove. The groove alleviates placement of a seal member 5 such as gasket and/or an O-ring. The seal member 5 is ideally disposed between the brim portion 3*b* and the housing of a flow meter.

The membrane 4 mechanically connects to a piezoelectric member 6. More specifically, the second side of the membrane 4 mechanically connects to the piezoelectric member 6. The piezoelectric member 6 is advantageously glued to the membrane 4. More specifically, the piezoelectric member 6 is advantageously glued to the second side of the membrane 4.

A resin is preferably employed to glue the piezoelectric member 6 to the membrane 4, especially to the second side of the membrane 4. The resin can be an epoxy resin and/or a polyester resin. The glass transition temperature of the resin ideally exceeds 353 Kelvins and/or exceeds 373 Kelvins and/or exceeds 393 Kelvins. In an embodiment, the glass transition temperature of the epoxy resin exceeds 353 Kelvins and/or exceeds 373 Kelvins and/or exceeds 393 Kelvins. High glass transition temperatures confer benefits in terms of temperature withstand. In an embodiment, the epoxy resin is a heat curing resin. In another embodiment, the epoxy resin is cured using light such as ultraviolet light.

According to an aspect of the present disclosure, the mechanical connection between the piezoelectric member 6 and the membrane 4 involves a layer of epoxy resin. More specifically, the mechanical connection between the piezoelectric member 6 and the second side of the membrane 4 involves a layer of epoxy resin. The layer of epoxy resin preferably is less than 0.5 millimetres thick, more preferably less than 0.2 millimetres thick, or even less than 0.1 millimetres thick. Thin layers of epoxy resin improve on the ultrasonic coupling between the piezoelectric member 6 and any fluid in a fluid path of a flow meter.

According to another aspect of the present disclosure, the mechanical connection between the piezoelectric member 6 and the membrane 4 involves a layer of polyester resin. More specifically, the mechanical connection between the piezoelectric member 6 and the second side of the membrane 4 involves a layer of polyester resin. The layer of polyester resin preferably is less than 0.5 millimetres thick, more preferably less than 0.2 millimetres thick, or even less than 0.1 millimetres thick. Thin layers of polyester resin improve on the ultrasonic coupling between the piezoelectric member 6 and any fluid in a fluid path of a flow meter.

Compared to polyester resins, epoxy resins exhibit less heat shrink when being cured. Reduced heat shrink lowers mechanical strains in any resin layer between the piezoelectric member 6 and the membrane 4. More specifically, reduced heat shrink lowers mechanical strains in any resin layer between the piezoelectric member 6 and the second side of the membrane 4.

It is envisaged that the layer of epoxy resin in its cured state exhibits a Shore D hardness of at least 60 or even 70. High levels of Shore D hardness of the epoxy layer improve on the long-term mechanical stability of the layer.

The piezoelectric member 6 has a first side and a second side opposite the first side. The second side of the piezoelectric member 6 faces away from the membrane 4. A wrap-around electrode advantageously connects to an outer surface of the piezoelectric member 6. Due to the wrap-around electrode, the piezoelectric member 6 provides two electric connections on the same side of the piezoelectric member 6. More specifically, the piezoelectric member 6 provides two electric connections such as a positive and a negative electric connection on its second side. A cable 7 having a plurality of conductors can thus electrically connect to the second side of the piezoelectric member 6.

The cable 7 advantageously is or comprises a flat, flexible cable. A flat cable 7 preferably is less than 0.3 millimetres thick, more preferably less than 0.2 millimetres thick, or even less than 0.1 millimetres thick. A flat cable 7 results in compact connections between the conductors of the cable and the piezoelectric member 6. The cable 7 also has flexibility. A flexible cable 7 absorbs vibrations such as vibrations having frequencies above 200 Kilohertz or above 500 Kilohertz or even above 1 Megahertz. The flexible cable 7 thus attenuates oscillations and/or vibrations transferred via the cable 7 to the piezoelectric member 6. In an embodiment, the cable 7 comprises a plurality of conductors arranged between layers a polymeric material. In a special embodiment the cable 7 comprises a plurality of conductors arranged between layers of polyethylene terephthalate.

A temperature transducer 2 is mounted to the cable 7. It is envisaged that the temperature transducer 2 comprises a resistor having a positive temperature coefficient or a negative temperature coefficient. The temperature transducer 2 can, by way of non-limiting example, comprise a Pt100 resistor and/or a Pt1000 resistor and/or a Ni100 resistor and/or a Ni1000 resistor. It is also envisaged that the temperature transducer 2 is a resistor having a positive temperature coefficient or a negative temperature coefficient. The temperature transducer 2 can, by way of non-limiting example, be a Pt100 resistor and/or a Pt1000 resistor and/or a Ni100 resistor and/or a Ni1000 resistor. The above lists are not exhaustive.

According to an aspect of the present disclosure, the temperature transducer 2 comprises a thermocouple such as a nickel-alloy thermocouple and/or a platinum/rhodium-alloy thermocouple. The temperature transducer 2 can also comprise a tungsten/rhenium-alloy thermocouple. It is still envisaged that the temperature transducer 2 is a thermocouple such as a nickel-alloy thermocouple and/or a platinum/rhodium-alloy thermocouple. The temperature transducer 2 can also be a tungsten/rhenium-alloy thermocouple.

The temperature transducer 2 is advantageously soldered onto the flexible cable 7. The temperature transducer 2 can comprise a surface-mounted device mounted to the flexible cable 7. More specifically, the temperature transducer 2 can be or can comprise a surface-mounted device soldered onto the flexible cable 7.

In a special embodiment, the temperature transducer 2 is soldered onto the piezoelectric member 6. The temperature transducer 2 can comprise a surface-mounted device mounted to the piezoelectric member 6. More specifically, the temperature transducer 2 can be or can comprise a surface-mounted device soldered onto the piezoelectric member 6.

The sensor assembly 1 can also comprise a cover 8. The cover 8 has outer dimensions such that it fits in the tubular portion 3b of the housing 3a, 3b of the sensor assembly 1. It is envisaged that the cover 8 is mounted inside the tubular portion 3b via a bolted connection. To that end, the cover 8 can provide a thread that engages a thread on the inside of the tubular portion 3b. It is also envisaged that the cover 8 is glued to the inner wall of the tubular portion 3b. Epoxy resins and polyester resins as described above can be employed to glue the cover 8 to the tubular portion 3b.

The cover 8 provides a slot. The slot has dimensions such that the cable 7 can extend through the slot of the cover 8. The slot is narrow enough such that any resin used during assembly will not leak through the slot. The dimensions of the slot can also depend on the characteristics of resins such as their viscosities at temperatures of 293 Kelvins or even at 433 Kelvins.

Figure 2:
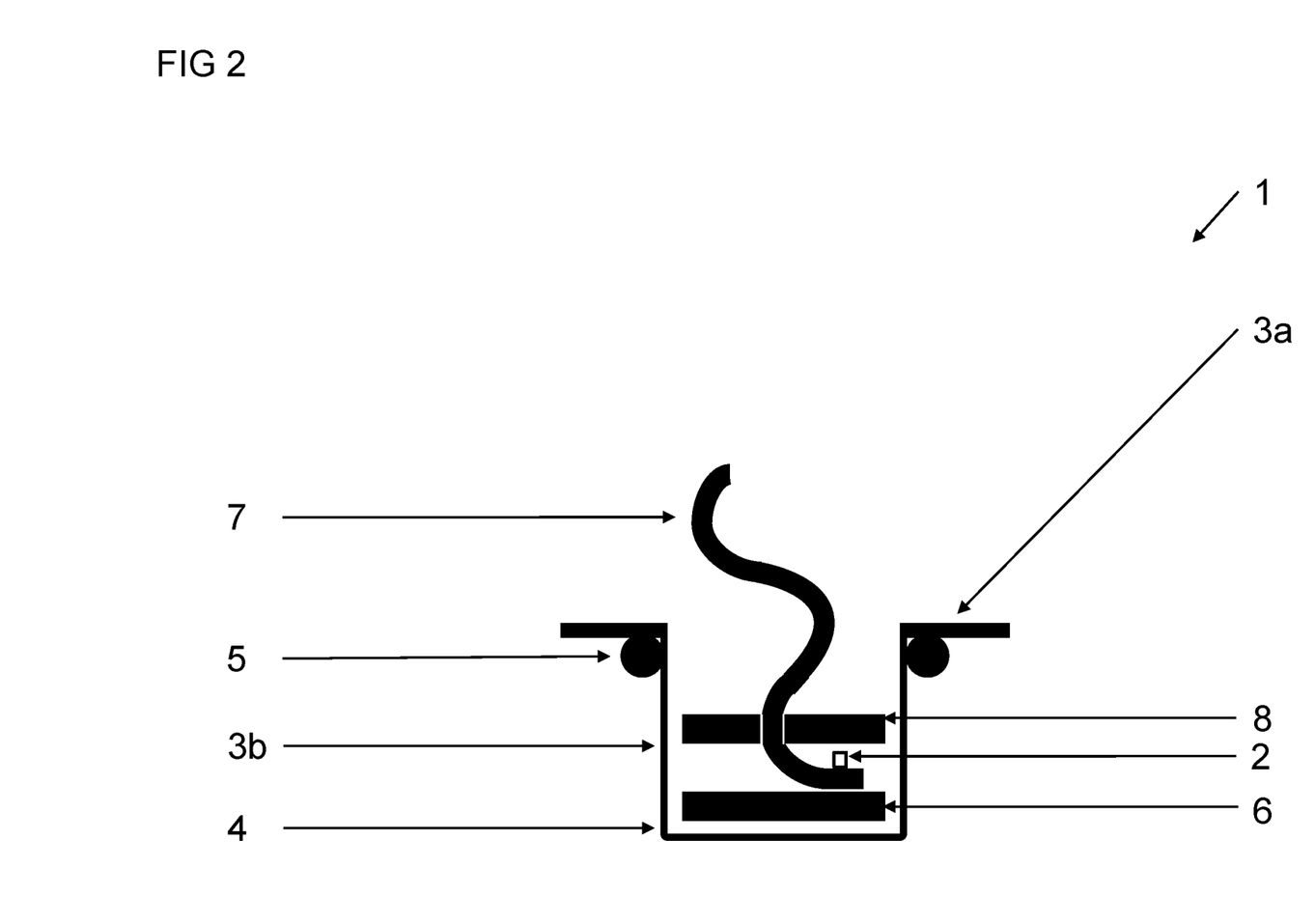
FIG. 2 shows the various components after assembly.

FIG. 2 shows the arrangement after assembly. The piezoelectric member 6 is arranged at or near the centre of the membrane 5. An annular, lateral gap envelopes the piezoelectric member 6. The annular, lateral gap is disposed between the piezoelectric member 6 and an inner wall of the tubular member 3b. The annular, lateral gap is preferably filled with air. It isolates the piezoelectric member from oscillations and/or from vibrations of the tubular member 3b. Likewise, the gap isolates the tubular member 3b from oscillations and/or from vibrations of the piezoelectric member 6.

A longitudinal gap separates the piezoelectric member 6 from the cover 8. The longitudinal gap is arranged between the second surface of the piezoelectric member 6 and the cover 8. The longitudinal gap is largely filled with air. The temperature transducer 2 can be disposed inside the longitudinal gap. A portion of the cable 7 can also be arranged inside the longitudinal gap. The longitudinal gap isolates the piezoelectric member 6 from oscillations and/or from vibrations of the cover 8.

The cover 8 has a first side facing the longitudinal gap and pointing toward the membrane 4. cover 8 also has a second side opposite the first side. A portion made of cast resin can project from the second side of the cover 8. Epoxy resins and/or polyester resins can be employed to form the cast resin portion. Silicone resins such as room temperature vulcanising rubbers can also be employed to form the cast resin portion. The cast resin portion functions to seal the sensor assembly 1, especially the tubular portion 3b of the housing 3a, 3b.

The gap between the piezoelectric member 6 and the cover 8 also isolates the member 6 from oscillations and/or from vibrations of the cast resin portion.

As described in detail herein, the instant disclosure teaches a housing (3a, 3b) comprising a tubular portion (3b), a membrane (4), a cable (7), an ultrasonic sensor (6), and a further sensor (2);

wherein the tubular portion (3b) comprises a first end;
wherein the tubular portion (3b) connects to the membrane (4) at the first end of the tubular portion (3b);
wherein the ultrasonic sensor (6) comprises a piezoelectric transducer and a wrap-around electrode;
wherein the piezoelectric transducer comprises a first side and a second side, the second side of the piezoelectric transducer being disposed opposite the first side of the piezoelectric transducer;
wherein the first side of the piezoelectric transducer is mounted to the membrane (4);
wherein the wrap-around electrode comprises a first portion and a second portion, the second portion of the wrap-around electrode connecting to the first portion of the wrap-around electrode;
wherein the first portion of the wrap-around electrode is arranged at the first side of the piezoelectric transducer and the second portion of the wrap-around electrode is arranged at the second side of the piezoelectric transducer;
wherein the second side of the piezoelectric transducer, the second portion of the wrap-around electrode, and the further sensor (2) connect to the cable (7); and
wherein the tubular portion (3b) comprises inner walls and the further sensor (2) is arranged in between the inner walls of the tubular portion (3b).

It is envisaged a sensor assembly (1) according to the present disclosure is a sensor assembly (1) for a flow meter. It is still envisaged that a sensor assembly (1) according to the present disclosure is a sensor assembly (1) for an ultrasonic flow meter.

It is still further envisaged a sensor assembly (1) according to the present disclosure is a sensor assembly (1) of a flow meter. It is yet further envisaged that a sensor assembly (1) according to the present disclosure is a sensor assembly (1) of an ultrasonic flow meter.

The tubular portion (3b) advantageously comprises a cylindrical member. In an embodiment, the tubular portion (3b) is a cylindrical member.

The tubular portion (3b) ideally comprises an inner wall and the further sensor (2) is enveloped by the inner wall of the tubular portion (3b).

According to an aspect of the present disclosure, the tubular portion (3b) is different from the membrane (4). According to a further aspect of the present disclosure, the ultrasonic sensor (6) is different from the further sensor (2).

It is envisaged that the tubular portion (3b) mechanically connects to the membrane (4) at the first end of the tubular portion (3b). The mechanical connection between the membrane (4) and the first end of the tubular portion (3b) can, in an embodiment, be fluid tight. That is, no leakage of a medium flowing through a flow channel of a flow meter occurs through the mechanical connection between the membrane (4) and the tubular portion (3b).

In an embodiment, the second portion of the wrap-around electrode mechanically connects to the first portion of the wrap-around electrode. The second portion of the wrap-around electrode can also electrically connect to the first portion of the wrap-around electrode. The second portion of the wrap-around electrode can still electrically and mechanically connect to the first portion of the wrap-around electrode.

The first portion of the wrap-around electrode is advantageously arranged at or on the first side of the piezoelectric transducer and the second portion of the wrap-around electrode is advantageously arranged at or on the second side of the piezoelectric transducer.

The first end of the tubular portion (3b) preferably comprises a circular opening and/or an elliptical opening. The first end of the tubular portion (3b) ideally is a circular opening and/or is an elliptical opening. It is envisaged that the first end is circular and/or elliptical.

The piezoelectric transducer advantageously comprises a first side and a second side, the second side of the piezoelectric transducer facing away from the first side of the piezoelectric transducer. The piezoelectric transducer preferably comprises a first surface and a second surface, the second surface of the piezoelectric transducer being disposed opposite the first surface of the piezoelectric transducer. The piezoelectric transducer ideally comprises a first surface and a second surface, the second surface of the piezoelectric transducer facing away from the first surface of the piezoelectric transducer.

According to an aspect of the instant disclosure, the wrap-around electrode comprises a first surface and a second surface. It is envisaged that the first surface of the wrap-around electrode is arranged at or on the first side of the piezoelectric transducer and the second surface of the wrap-around electrode is arranged at or on the second side of the piezoelectric transducer. It is still envisaged that the first surface of the wrap-around electrode is arranged at or on the first surface of the piezoelectric transducer and the second surface of the wrap-around electrode is arranged at or on the second surface of the piezoelectric transducer.

The second side of the piezoelectric transducer can mechanically connect to the cable (7). The second side of the piezoelectric transducer can also electrically connect to the cable (7). It is still envisaged that the second side of the piezoelectric transducer can directly electrically connect to the cable (7). The further sensor (2) can mechanically connect to the cable (7). The further sensor (2) can also electrically connect to the cable (7). The further sensor (2) can also directly electrically connect to the cable (7). Also, the second surface of the piezoelectric transducer can mechanically connect to the cable (7). The second surface of the piezoelectric transducer can still electrically connect to the cable (7). It is still envisaged that the second surface of the piezoelectric transducer can directly electrically connect to the cable (7). A direct electric connection between a member and the cable (7) implies that no additional member, especially no wrap-around electrode, is electrically arranged in between the member and the cable (7).

The present disclosure still teaches any of the sensor assemblies (1) disclosed herein, wherein the further sensor (2) comprises a temperature transducer; and
wherein the temperature transducer connects to the cable (7).

It is envisaged that the temperature transducer comprises a resistor having a negative temperature coefficient or a positive temperature coefficient. It is still envisaged that the temperature transducer comprises a Ni100 resistor and/or a Ni1000 resistor and/or a Pt100 resistor and/or a Pt1000 resistor. It is also envisaged that the temperature transducer is a resistor having a negative temperature coefficient or a positive temperature coefficient. It is further envisaged that the temperature transducer is a Ni100 resistor and/or a Ni1000 resistor and/or a Pt100 resistor and/or a Pt1000 resistor.

According to an aspect of the present disclosure, the temperature transducer comprises a thermocouple. According to a related aspect of the present disclosure, the temperature transducer is a thermocouple.

The temperature transducer can mechanically connect to the cable (7). The temperature transducer can also electrically connect to the cable (7). In an embodiment, the temperature transducer electrically and mechanically connects to the cable (7).

According to an aspect of the present disclosure, the temperature transducer comprises an optical temperature transducer such as a fibre Bragg grating. According to a related aspect of the present disclosure, the temperature transducer is a fibre Bragg grating. The optical temperature transducer can mechanically connect to the cable (7). The optical temperature transducer can also optically connect to the cable (7). To that end, the cable (7) can comprise one or more optical fibres. Optical sensors confer benefits in explosive and/or hazardous environments.

The instant disclosure still teaches any of the sensor assemblies (1) disclosed herein, wherein the first side of the piezoelectric transducer is mounted to the membrane (4) via a layer of polymeric resin; and
wherein the layer of polymeric resin is less than 500 micrometres thick.

In an embodiment, the layer of polymeric resin comprises a layer of epoxy resin. In an alternate embodiment, the layer of polymeric resin comprises a layer of polyester resin.

In a special embodiment, the layer of polymeric resin is less than 200 micrometres thick. In another embodiment, the layer of polymeric resin is less than 100 micrometres thick.

The instant disclosure still teaches any of the sensor assemblies (1) disclosed herein,
wherein the first portion of the wrap-around electrode electrically connects to the first side of the piezoelectric transducer; and
the second portion of the wrap-around electrode is electrically isolated from the second side of the piezoelectric transducer.

The present disclosure still teaches any of the sensor assemblies (1) disclosed herein,
wherein the first portion of the wrap-around electrode directly electrically connects to the first side of the piezoelectric transducer; and
the second portion of the wrap-around electrode is electrically isolated from the second side of the piezoelectric transducer.

The instant disclosure still teaches any of the sensor assemblies (1) disclosed herein,
wherein the first portion of the wrap-around electrode electrically connects to the first side of the piezoelectric transducer.

The present disclosure still teaches any of the sensor assemblies (1) disclosed herein,
wherein the first portion of the wrap-around electrode directly electrically connects to the first side of the piezoelectric transducer.

The instant disclosure still teaches any of the sensor assemblies (1) disclosed herein,
wherein the wrap-around electrode comprises a bridge member; and
the bridge member electrically and/or mechanically connects the first portion of the wrap-around electrode to the second portion of the wrap-around electrode.

According to an aspect of the present disclosure,
the first surface of the wrap-around electrode electrically connects to the first surface of the piezoelectric transducer;
the second surface of the wrap-around electrode is electrically isolated from the second surface of the piezoelectric transducer; and the first surface of the wrap-around electrode electrically connects to the second surface of the wrap-around electrode.

According to a further aspect of the instant disclosure, the first surface of the wrap-around electrode directly electrically connects to the first surface of the piezoelectric transducer;

the second surface of the wrap-around electrode is electrically isolated from the second surface of the piezoelectric transducer; and the first surface of the wrap-around electrode directly electrically connects to the second surface of the wrap-around electrode.

According to still another aspect of the present disclosure, the wrap-around electrode comprises a bridge member; and the bridge member electrically and/or mechanically connects the first surface of the wrap-around electrode to the second surface of the wrap-around electrode.

The first surface of the wrap-around electrode advantageously is different from the second surface of the wrap-around electrode.

The instant disclosure still teaches any of the sensor assemblies (1) disclosed herein, wherein the further sensor (2) electrically connects to the cable (7); and wherein the further sensor (2) is disposed at the second portion of the wrap-around electrode.

The present disclosure still teaches any of the sensor assemblies (1) disclosed herein, wherein the further sensor (2) directly electrically connects to the cable (7); and wherein the further sensor (2) is disposed at or near the second portion of the wrap-around electrode.

The present disclosure further teaches any of the sensor assemblies (1) disclosed herein, wherein the further sensor (2) electrically and mechanically connects to the cable (7); and wherein the further sensor (2) is disposed at or near the second portion of the wrap-around electrode.

The present disclosure still further teaches any of the sensor assemblies (1) disclosed herein, wherein the further sensor (2) mechanically and directly electrically connects to the cable (7); and wherein the further sensor (2) is disposed at or near the second portion of the wrap-around electrode.

The instant disclosure still teaches any of the sensor assemblies (1) disclosed herein and comprising a temperature transducer, wherein the temperature transducer directly electrically connects to the cable (7); and wherein the temperature transducer is disposed at or near the second portion of the wrap-around electrode.

The present disclosure further teaches any of the sensor assemblies (1) disclosed herein and comprising a temperature transducer, wherein the temperature transducer electrically and mechanically connects to the cable (7); and wherein the temperature transducer is disposed at or near the second portion of the wrap-around electrode.

The present disclosure still further teaches any of the sensor assemblies (1) disclosed herein and comprising a temperature transducer, wherein the temperature transducer mechanically and directly electrically connects to the cable (7); and wherein the temperature transducer is disposed at or near the second portion of the wrap-around electrode.

The present disclosure still teaches any of the sensor assemblies (1) disclosed herein, wherein the further sensor (2) directly electrically connects to the cable (7); and wherein the further sensor (2) is disposed within 2 millimetres, preferably within 1 millimetre, from the second portion of the wrap-around electrode.

The present disclosure further teaches any of the sensor assemblies (1) disclosed herein, wherein the further sensor (2) electrically and mechanically connects to the cable (7); and wherein the further sensor (2) is disposed within 2 millimetres, preferably within 1 millimetre, from the second portion of the wrap-around electrode.

The present disclosure still further teaches any of the sensor assemblies (1) disclosed herein, wherein the further sensor (2) mechanically and directly electrically connects to the cable (7); and wherein the further sensor (2) is disposed within 2 millimetres, preferably within 1 millimetre, from the second portion of the wrap-around electrode.

The instant disclosure still teaches any of the sensor assemblies (1) disclosed herein and comprising a temperature transducer, wherein the temperature transducer directly electrically connects to the cable (7); and wherein the temperature transducer is disposed within 2 millimetres, preferably within 1 millimetre, from the second portion of the wrap-around electrode.

The present disclosure further teaches any of the sensor assemblies (1) disclosed herein and comprising a temperature transducer, wherein the temperature transducer electrically and mechanically connects to the cable (7); and wherein the temperature transducer is disposed within 2 millimetres, preferably within 1 millimetre, from the second portion of the wrap-around electrode.

The present disclosure still further teaches any of the sensor assemblies (1) disclosed herein and comprising a temperature transducer, wherein the temperature transducer mechanically and directly electrically connects to the cable (7); and wherein the temperature transducer is disposed within 2 millimetres, preferably within 1 millimetre, from the second portion of the wrap-around electrode.

Proximity between the temperature transducer and the piezoelectric transducer improves on the thermal coupling between a medium inside a flow path of a flow meter and the temperature transducer.

The present disclosure further teaches any of the sensor assemblies (1) disclosed herein, wherein the further sensor (2) electrically connects to the cable (7); and wherein the further sensor (2) is mounted to the second side of the piezoelectric transducer.

The instant disclosure further teaches any of the sensor assemblies (1) disclosed herein and comprising a further sensor (2) at or near the second portion of the wrap-around electrode, wherein the further sensor (2) is mounted to the second side of the piezoelectric transducer.

The instant disclosure still further teaches any of the sensor assemblies (1) disclosed herein and comprising a further sensor (2) at or near the second portion of the wrap-around electrode, wherein the further sensor (2) is directly mounted to the second side of the piezoelectric transducer.

The instant disclosure further teaches any of the sensor assemblies (1) disclosed herein and comprising a temperature transducer at or near the second portion of the wrap-around electrode,
  wherein the temperature transducer is mounted to the second side of the piezoelectric transducer.

The instant disclosure still further teaches any of the sensor assemblies (1) disclosed herein and comprising a temperature transducer at or near the second portion of the wrap-around electrode,
  wherein the temperature transducer is directly mounted to the second side of the piezoelectric transducer.

The instant disclosure further teaches any of the sensor assemblies (1) disclosed herein,
  wherein the further sensor (2) electrically connects to the cable (7); and
  wherein the further sensor (2) is mounted to the cable (7).

The instant disclosure further teaches any of the sensor assemblies (1) disclosed herein and comprising a further sensor (2) at or near the second portion of the wrap-around electrode,
  wherein the cable (7) comprises a flexible cable;
  wherein the flexible cable at a temperature of 293 Kelvins has in at least one direction a Young's modulus of less than 500 Megapascals; and
  wherein the further sensor (2) is mounted to the flexible cable.

The instant disclosure still further teaches any of the sensor assemblies (1) disclosed herein and comprising a further sensor (2) at or near the second portion of the wrap-around electrode,
  wherein the cable (7) comprises a flexible cable;
  wherein the flexible cable at a temperature of 293 Kelvins has in at least one direction a Young's modulus of less than 500 Megapascals; and
  wherein the further sensor (2) is directly mounted to the flexible cable.

The instant disclosure further teaches any of the sensor assemblies (1) disclosed herein and comprising a temperature transducer at or near the second portion of the wrap-around electrode,
  wherein the cable (7) comprises a flexible cable;
  wherein the flexible cable at a temperature of 293 Kelvins has in at least one direction a Young's modulus of less than 500 Megapascals; and
  wherein the temperature transducer is mounted to the flexible cable.

The instant disclosure still further teaches any of the sensor assemblies (1) disclosed herein and comprising a temperature transducer at or near the second portion of the wrap-around electrode,
  wherein the cable (7) comprises a flexible cable;
  wherein the flexible cable at a temperature of 293 Kelvins has in at least one direction a Young's modulus of less than 500 Megapascals; and
  wherein the temperature transducer is directly mounted to the flexible cable.

The present disclosure further teaches any of the sensor assemblies (1) disclosed herein and comprising a further sensor (2) at or near the second portion of the wrap-around electrode,
  wherein the cable (7) is a flexible cable;
  wherein the flexible cable at a temperature of 293 Kelvins has in at least one direction a Young's modulus of less than 500 Megapascals; and
  wherein the further sensor (2) is mounted to the flexible cable.

The present disclosure still further teaches any of the sensor assemblies (1) disclosed herein and comprising a further sensor (2) at or near the second portion of the wrap-around electrode,
  wherein the cable (7) is a flexible cable;
  wherein the flexible cable at a temperature of 293 Kelvins has in at least one direction a Young's modulus of less than 500 Megapascals; and
  wherein the further sensor (2) is directly mounted to the flexible cable.

The present disclosure further teaches any of the sensor assemblies (1) disclosed herein and comprising a temperature transducer at or near the second portion of the wrap-around electrode,
  wherein the cable (7) is a flexible cable;
  wherein the flexible cable at a temperature of 293 Kelvins has in at least one direction a Young's modulus of less than 500 Megapascals; and
  wherein the temperature transducer is mounted to the flexible cable.

The present disclosure still further teaches any of the sensor assemblies (1) disclosed herein and comprising a temperature transducer at or near the second portion of the wrap-around electrode,
  wherein the cable (7) is a flexible cable;
  wherein the flexible cable at a temperature of 293 Kelvins has in at least one direction a Young's modulus of less than 500 Megapascals; and
  wherein the temperature transducer is directly mounted to the flexible cable.

The present disclosure also teaches any of the sensor assemblies (1) disclosed herein,
  wherein the further sensor (2), the piezoelectric transducer, and the wrap-around electrode are arranged in between the inner walls of the tubular portion (3*b*).

The tubular portion (3*b*) ideally comprises an inner wall and the further sensor (2), the piezoelectric transducer, and the wrap-around electrode are enveloped by the inner wall of the tubular portion (3*b*).

The present disclosure also teaches any of the sensor assemblies (1) disclosed herein,
  wherein the membrane (4), the further sensor (2), the piezoelectric transducer, and the wrap-around electrode are arranged in between the inner walls of the tubular portion (3*b*).

The present disclosure further teaches any of the sensor assemblies (1) disclosed herein and comprising a temperature transducer,
  wherein the temperature transducer, the piezoelectric transducer, and the wrap-around electrode are arranged in between the inner walls of the tubular portion (3*b*).

The present disclosure further teaches any of the sensor assemblies (1) disclosed herein and comprising a temperature transducer,
  wherein the membrane (4), temperature transducer, the piezoelectric transducer, and the wrap-around electrode are arranged in between the inner walls of the tubular portion (3*b*).

The instant disclosure also teaches any of the sensor assemblies (1) disclosed herein,
  wherein a portion of the cable (7) such as a flexible portion of the cable, the further sensor (2), the piezoelectric transducer, and the wrap-around electrode are arranged in between the inner walls of the tubular portion (3*b*).

The instant disclosure further teaches any of the sensor assemblies (1) disclosed herein and comprising a temperature transducer,
wherein a portion of the cable (7) such as a flexible portion of the cable, the temperature transducer, the piezoelectric transducer, and the wrap-around electrode are arranged in between the inner walls of the tubular portion (3b).

The instant disclosure further teaches any of the sensor assemblies (1) disclosed herein and comprising a temperature transducer,
wherein the membrane (4), a portion of the cable (7) such as a flexible portion of the cable, the temperature transducer, the piezoelectric transducer, and the wrap-around electrode are arranged in between the inner walls of the tubular portion (3b).

The instant disclosure further teaches any of the sensor assemblies (1) disclosed herein,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a space; and
wherein the further sensor (2), the piezoelectric transducer, and the wrap-around electrode are arranged inside the space.

It is envisaged that an inner wall of the tubular portion (3b), the first end of the tubular portion (3b), and the second end of the tubular portion (3b) define a space.

The present disclosure also teaches any of the sensor assemblies (1) disclosed herein,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a space; and
wherein the membrane (4), the further sensor (2), the piezoelectric transducer, and the wrap-around electrode are arranged inside the space.

The present disclosure further teaches any of the sensor assemblies (1) disclosed herein,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a space; and
wherein a portion of the cable (7) such as a flexible portion of the cable (7), the further sensor (2), the piezoelectric transducer, and the wrap-around electrode are arranged inside the space.

The present disclosure still further teaches any of the sensor assemblies (1) disclosed herein,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a cylindrical cavity; and
wherein the further sensor (2), the piezoelectric transducer, and the wrap-around electrode are arranged inside the cylindrical cavity.

The instant disclosure also teaches any of the sensor assemblies (1) disclosed herein and comprising a temperature transducer,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a space; and
wherein the membrane (4), the temperature transducer, the piezoelectric transducer, and the wrap-around electrode are arranged inside the space.

The instant disclosure further teaches any of the sensor assemblies (1) disclosed herein and comprising a temperature transducer,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a space; and
wherein a portion of the cable (7) such as a flexible portion of the cable (7), the temperature transducer, the piezoelectric transducer, and the wrap-around electrode are arranged inside the space.

The instant disclosure still further teaches any of the sensor assemblies (1) disclosed herein and comprising a temperature transducer,
wherein the tubular portion (3b) comprises a second end, the second end of the tubular portion (3b) being disposed opposite the first end of the tubular portion (3b);
wherein the inner walls, the first end of the tubular portion (3b), and the second end of the tubular portion (3b) define a cylindrical cavity; and
wherein the temperature transducer, the piezoelectric transducer, and the wrap-around electrode are arranged inside the cylindrical cavity.

The second end of the tubular portion (3b) preferably comprises a circular opening and/or an elliptical opening. The second end of the tubular portion (3b) ideally is a circular opening and/or is an elliptical opening. It is envisaged that the first end is circular and/or elliptical.

The present disclosure also teaches any of the aforementioned sensor assemblies (1), wherein the tubular portion (3b) comprises a second end, the second end of the tubular portion (3b) being disposed opposite the first end of the tubular portion (3b);
wherein the housing (3a, 3b) comprises a brim portion (3a);
wherein the brim portion (3a) connects to the second end of the tubular portion (3b); and
wherein the brim portion (3a) projects radially from the tubular portion (3b).

It is envisaged that the brim portion (3a) and the tubular portion (3b) form one piece.

According to an aspect of the present disclosure, the tubular portion (3b) defines a radial direction. The radial direction is perpendicular to an axial direction of the tubular portion (3b), the axial direction preferably running from the first end of the tubular portion (3b) to the second end of the tubular portion (3b).

The instant disclosure still further teaches any of the aforementioned sensor assemblies (1) having a brim portion (3a),
wherein the sensor assembly (1) comprises a seal member (5) arranged adjacent the brim portion (3a).

In an embodiment, the seal member (5) comprises an O-ring. In a related embodiment, the seal member (5) is an O-ring. In another embodiment, the seal member (5) comprises a gasket. In yet another embodiment, the seal member (5) is a gasket.

The instant disclosure still further teaches any of the aforementioned sensor assemblies (1) having a brim portion (3*a*) and a seal member (5),
- wherein the brim portion (3*a*) comprises a groove; and
- wherein a portion of the seal member (5) is arranged in the groove.

The instant disclosure also teaches any of the aforementioned sensor assemblies (1) having a brim portion (3*a*) and a seal member (5),
- wherein the brim portion (3*a*) comprises a groove; and
- wherein a portion of the seal member (5) is arranged inside the groove.

The instant disclosure further teaches any of the aforementioned sensor assemblies (1) having a brim portion (3*a*) and a seal member (5),
- wherein the brim portion (3*a*) comprises a groove;
- wherein the seal member (5) comprises a groove portion; and
- wherein the groove portion of the seal member (5) is arranged in the groove of the brim portion (3*a*).

The instant disclosure still further teaches any of the aforementioned sensor assemblies (1) having a brim portion (3*a*) and a seal member (5),
- wherein the brim portion (3*a*) comprises a groove;
- wherein the seal member (5) comprises a groove portion; and
- wherein the groove portion of the seal member (5) is arranged inside the groove of the brim portion (3*a*).

The instant disclosure still further teaches any of the aforementioned sensor assemblies (1),
- wherein an annular, air-filled gap envelopes the piezoelectric transducer; and
- wherein the annular, air-filled gap is disposed between the piezoelectric transducer and the tubular portion (3*b*).

The present disclosure still further teaches any of the aforementioned sensor assemblies (1),
- wherein the sensor assembly (1) comprises a cover (8) arranged in between the inner walls; and
- wherein the second side of the piezoelectric transducer faces the cover (8).

It is envisaged that the cover (8) comprises a cover lid. It is also envisaged that the cover (8) is a cover lid.

It is envisaged that the cover (8) is mounted to the inner wall and/or is mounted to the inner walls.

The present disclosure also teaches any of the aforementioned sensor assemblies (1),
- wherein the sensor assembly (1) comprises a cover (8) arranged in between the inner walls; and
- wherein the temperature transducer (2) is interposed between the membrane (4) and the cover (8).

The present disclosure further teaches any of the aforementioned sensor assemblies (1),
- wherein the sensor assembly (1) comprises a cover (8) arranged in between the inner walls; and
- wherein the temperature transducer (2) is interposed between the membrane (4) and the cover (8).

The present disclosure still further teaches any of the aforementioned sensor assemblies (1),
- wherein the sensor assembly (1) comprises a cover (8) arranged in between the inner walls; and
- wherein the temperature transducer (2) is interposed between the piezoelectric transducer and the cover (8).

The present disclosure still further teaches any of the aforementioned sensor assemblies (1) having a cover (8),
- wherein the cover (8) comprises an opening; and
- wherein the cable (7) extends through the opening of the cover (8).

It is envisaged that the opening of the cover (8) comprises a slot. It is also envisaged that the opening of the cover (8) is a slot.

The present disclosure still further teaches any of the aforementioned sensor assemblies (1) having a cover (8) and an opening of the cover (8),
- wherein the cable (7) comprises a first portion and a second portion, the second portion of the cable (7) being different from the first portion of the cable (7);
- wherein the first portion of the cable (7) is arranged between the cover (8) and the piezoelectric transducer;
- wherein the first portion of the cable (7) at a temperature of 293 Kelvins has flexibility in at least one direction; and
- wherein the second portion of the cable (7) at a temperature of 293 Kelvins is stiff.

The present disclosure still further teaches any of the aforementioned sensor assemblies (1) having a cover (8) and an opening of the cover (8),
- wherein the cable (7) comprises a first portion and a second portion, the second portion of the cable (7) being different from the first portion of the cable (7);
- wherein the first portion of the cable (7) is arranged between the cover (8) and the piezoelectric transducer;
- wherein the first portion of the cable (7) at a temperature of 293 Kelvins in at least one direction has a Young's modulus of less than 500 Megapascals; and
- wherein the second portion of the cable (7) at a temperature of 293 Kelvins in at least one direction has a Young's modulus of more than 1 Gigapascal.

It should be understood that the foregoing relates only to certain embodiments of the disclosure and that numerous changes can be made therein without departing from the scope of the disclosure as defined by the following claims. It should also be understood that the disclosure is not restricted to the illustrated embodiments and that various modifications can be made within the scope of the claims.

REFERENCE NUMERALS

1 sensor assembly
2 further sensor
3*a*, 3*b* housing
4 membrane
5 seal member
6 ultrasonic sensor
7 cable
8 cover

The invention claimed is:

1. A sensor assembly comprising:
   a housing comprising a tubular portion, a membrane, a cable, an ultrasonic sensor, and a further sensor;
   wherein the tubular portion comprises a first end;
   wherein the tubular portion connects to the membrane at the first end of the tubular portion;
   wherein the ultrasonic sensor comprises a piezoelectric transducer and a wrap-around electrode;
   wherein the piezoelectric transducer comprises a first side and a second side, the second side of the piezoelectric transducer being disposed opposite the first side of the piezoelectric transducer;
   wherein the first side of the piezoelectric transducer is mounted to the membrane;

wherein the wrap-around electrode comprises a first portion and a second portion, the second portion of the wrap-around electrode connecting to the first portion of the wrap-around electrode;
wherein the first portion of the wrap-around electrode is arranged at the first side of the piezoelectric transducer, between the piezoelectric transducer and the membrane, and the second portion of the wrap-around electrode is arranged at the second side of the piezoelectric transducer;
wherein the second side of the piezoelectric transducer, the second portion of the wrap-around electrode, and the further sensor connect to the cable; and
wherein the tubular portion comprises inner walls and the further sensor is arranged in between the inner walls of the tubular portion.

2. The sensor assembly according to claim 1,
wherein the further sensor comprises a temperature transducer; and
wherein the temperature transducer connects to the cable.

3. The sensor assembly according to claim 1,
wherein the first side of the piezoelectric transducer is mounted to the membrane via a layer of polymeric resin; and
wherein the layer of polymeric resin is less than 500 micrometres thick.

4. The sensor assembly according to claim 1,
wherein the first portion of the wrap-around electrode electrically connects to the first side of the piezoelectric transducer.

5. The sensor assembly according to claim 1,
wherein the further sensor electrically connects to the cable; and
wherein the further sensor is disposed at the second portion of the wrap-around electrode.

6. The sensor assembly according to claim 5,
wherein the further sensor is mounted to the second side of the piezoelectric transducer.

7. The sensor assembly according to claim 5,
wherein the further sensor is mounted to the cable.

8. The sensor assembly according to claim 1,
wherein the further sensor, the piezoelectric transducer, and the wrap-around electrode are arranged in between the inner walls of the tubular portion.

9. The sensor assembly according to claim 1,
wherein the tubular portion comprises a second end, the second end of the tubular portion being disposed opposite the first end of the tubular portion;
wherein the inner walls of the tubular portion, the first end of the tubular portion, and the second end of the tubular portion define a space; and
wherein the further sensor, the piezoelectric transducer, and the wrap-around electrode are arranged inside the space.

10. The sensor assembly according to claim 1,
wherein the tubular portion comprises a second end, the second end of the tubular portion being disposed opposite the first end of the tubular portion;
wherein the housing comprises a brim portion;
wherein the brim portion connects to the second end of the tubular portion; and
wherein the brim portion projects radially from the tubular portion.

11. The sensor assembly according to claim 10,
wherein the sensor assembly comprises a seal member arranged adjacent the brim portion.

12. The sensor assembly according to claim 11,
wherein the brim portion comprises a groove; and
wherein a portion of the seal member is arranged in the groove.

13. The sensor assembly according to claim 1,
wherein an annular, air-filled gap envelopes the piezoelectric transducer; and
wherein the annular, air-filled gap is disposed between the piezoelectric transducer and the tubular portion.

14. The sensor assembly according to claim 1,
wherein the sensor assembly comprises a cover arranged in between the inner walls; and
wherein the second side of the piezoelectric transducer faces the cover.

15. The sensor assembly according to claim 14,
wherein the cover comprises an opening; and
wherein the cable extends through the opening of the cover.

* * * * *